US006914542B2

(12) United States Patent
Hutton (10) Patent No.: US 6,914,542 B2
(45) Date of Patent: Jul. 5, 2005

(54) METHOD AND SYSTEM FOR PARKING AIRCRAFT AT AN AIRPORT

(75) Inventor: Neil Hutton, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 10/292,481

(22) Filed: Nov. 13, 2002

(65) Prior Publication Data

US 2004/0090348 A1 May 13, 2004

(51) Int. Cl.⁷ .............................................. G08B 21/00
(52) U.S. Cl. ........................ 340/958; 244/114 R; 701/3
(58) Field of Search ................................. 340/958, 945, 340/506, 932.2; 244/114 R; 701/3, 120, 121; 73/128 R; 342/23; 356/461; 332/104, 216

(56) References Cited

U.S. PATENT DOCUMENTS

| | | | |
|---|---|---|---|
| 3,538,529 A | | 11/1970 | Breier |
| 3,729,262 A | | 4/1973 | Snead et al. |
| 4,184,655 A | * | 1/1980 | Anderberg ................... 340/958 |
| 6,100,964 A | * | 8/2000 | De Cremiers .............. 356/4.01 |
| 6,315,243 B1 | | 11/2001 | Peterson |
| 6,389,334 B1 | * | 5/2002 | Castor ............................ 701/3 |
| 6,481,039 B1 | * | 11/2002 | Rolfe et al. .................. 14/72.5 |
| 6,542,086 B2 | * | 4/2003 | Baumgartner et al. ....... 340/958 |
| 6,637,063 B1 | * | 10/2003 | Hutton et al. ................. 14/71.5 |
| 6,724,314 B2 | * | 4/2004 | Hutton .................... 340/686.1 |

2002/0104176 A1  8/2002  Thomas et al.

OTHER PUBLICATIONS

Burns & McDonnell: Jansen et al., "*Aircraft Parking: Three Fundamental Methods*", TechBriefs, No. 3, pp. 1–18, 2001.

* cited by examiner

*Primary Examiner*—Anh V. La
(74) *Attorney, Agent, or Firm*—Freedman & Associates (57) ABSTRACT

A method and system for parking aircraft at an airport terminal having a plurality of passenger loading bridges is disclosed. According to the invention, a parking space is defined at the terminal for an aircraft of a known type, such that at least a desired clearance is maintained between the aircraft of the known type and all other aircraft parked at the terminal. To this end, a passenger loading bridge associated with the defined parking space is moved so as to accommodate the known type of an aircraft at the defined parking space while maintaining the at least a desired clearance to all other aircraft parked at the terminal. In particular, at different instances of time for different instances of the known type of an aircraft, the associated passenger loading bridge is moved to substantially different locations to accommodate different defined parking spaces. A system for implementing the method includes a database having stored therein aircraft arrival information, a processor in communication with the database for defining the parking spaces such that at least a minimum spacing is maintained between adjacent aircraft and, a controller in communication with the processor, for controlling an interaction between aircraft and passenger loading bridges and terminal operations such that the defined aircraft parking spaces are implemented as actual parking spaces for the aircraft.

19 Claims, 9 Drawing Sheets

METHOD AND SYSTEM FOR PARKING AIRCRAFT AT AN AIRPORT

FIELD OF THE INVENTION

The present invention relates generally to passenger loading bridges and more particularly to a method and system for parking aircraft at an airport having such passenger loading bridges.

BACKGROUND OF THE INVENTION

In order to make aircraft passengers comfortable, and in order to transport them between an airport terminal building and an aircraft in such a way that they are protected from the weather and from other environmental influences, passenger loading bridges are used which can be telescopically extended and the height of which is adjustable. For instance, an apron drive bridge in present day use has a plurality of adjustable modules, including: a rotunda, a telescopic tunnel, a bubble section, a cab, and elevating columns with wheel carriage. Of course, other types of bridges are known in the art, such as for example radial drive bridges and pedestal bridges.

Unfortunately, there are a number of disadvantages associated with the use of passenger loading bridges at an airport. For instance, the process of aligning the passenger loading bridge with the aircraft is time consuming, which increases aircraft turn-around time and causes inconvenience to passengers aboard the aircraft. First, the pilot taxis the aircraft along a lead-in line to a final parking position within a gate area adjacent to the passenger loading bridge. Typically, the lead-in line is a physical marker that is painted onto the tarmac and which is used for guiding the aircraft along a predetermined path to a final and predetermined parking position. Additional markings in the form of stop lines are provided at predetermined positions along the lead-in line. Thus, when the nose gear of a particular type of aircraft stops precisely at the stop line for that type of aircraft, then the aircraft is known to be at its final parking position. Of course, the pilot's view of the tarmac surface from the cockpit of an aircraft is limited. This is particularly true for larger aircraft, such as for instance a Boeing 747. Typically, therefore, the pilot relies upon instructions that are provided by one of a human ground marshal and up to two "wing walkers" and an automated docking guidance system for guiding the aircraft along the lead-in line. Alternatively, a tractor or tug is used to tow the aircraft along the lead-in line to its final parking position.

After the aircraft has stopped at its final parking position, the passenger loading bridge is aligned with a doorway of the aircraft, which in the case of an apron drive bridge may involve extending the bridge by 15 to 20 meters or more. Driving the bridge over a long distance is very time consuming because often the rate at which the bridge is moved is limited in order to reduce the risk of colliding with ground service vehicles or personnel, and to avoid causing serious damage to the aircraft in the event of a collision therewith. Manual, semi-automated and fully-automated bridge alignment systems are known for adjusting the position of the passenger loading bridge relative to the parked aircraft.

As mentioned above, the lead-in lines are permanent markings painted onto the tarmac surface for guiding aircraft of different types to predetermined parking positions. The predetermined parking positions are determined during an airport planning stage. For instance, the airport planning stage includes a step of anticipating future usage for a period of approximately twenty years. Thereafter, a plan is drawn up showing an optimized distribution of the passenger loading bridges at the airport, based upon the anticipated future usage. Once the optimized distribution of the passenger loading bridges is known, the parking positions for different types of known aircraft are determined. For instance, different lead-in lines and stop lines are determined for large aircraft and for small aircraft at each passenger loading bridge. Optionally, same lead-in lines are used both for large aircraft and for small aircraft at some of the airport gates. Accordingly, aircraft of a same type always stop at approximately a same parking position at a same airport gate. Furthermore, the aircraft when stopped are spaced apart sufficiently to provide an adequate clearance between adjacent aircraft.

Of course, unexpected events or changing travel patterns may result in actual usage that is very different from the anticipated future usage. For instance, many airports currently are servicing a larger than anticipated number of commuter jet aircraft on a daily basis. Due to imperfect foresight on the part of the airport planners, commuter jet aircraft often are parked according to the lead-in lines that were originally designed for substantially larger aircraft, which translates into a less than optimal utilization of the airport apron space. Another problem that is often encountered at existing airports occurs when an unusually large number of large aircraft are being loaded or unloaded during a same overlapping period of time. For instance, some passenger loading bridges are taken out of service temporarily in order to free up additional apron space and to accommodate the large aircraft. Unfortunately, other aircraft may be required to stand-by until the large aircraft moves away from the terminal building, despite the fact that one or more passenger loading bridges remain unassigned. Under operating conditions such as these, a less than optimal use is being made of the available passenger loading bridge resources at the airport terminal.

Another limitation of the prior art is that a substantial amount of planning and analysis is required whenever additional passenger loading bridges are to be added at an existing terminal building. As during the initial airport planning stage, future usage must be anticipated and new aircraft stopping positions determined. It may be determined that, due to apron space considerations, some of the new passenger loading bridges must be restricted to servicing only certain types of aircraft, which could adversely affect the airport's ability to assign gates. Often, an additional terminal building is simply constructed when the current design of an airport approaches full capacity. This is undesirable, as the cost of an additional terminal building is very high relative to the cost of adding additional passenger loading bridges at an existing terminal building.

Similar problems to those mentioned above are also expected when a stretch version of an existing type of aircraft comes into service. The stretch version of an aircraft is longer and may additionally have a wider wingspan than its predecessor. For example, a 737–900 is ten feet eight inches longer than a 737–800 and has a wingspan that is four feet ten inches greater than that of a 737–800. Furthermore, many modern aircraft have an approximately vertically extending winglet mounted at each wingtip. Such winglets are standard equipment on certain models of aircraft, and are available as a retrofit item on certain other models of aircraft. However, the winglets do not extend absolutely vertically above the wing, and as such the winglets when present may increase the effective wingspan of a particular model of aircraft. Accordingly, it is necessary that an airport is able to adapt not only to different combinations of aircraft models, but also to combinations of aircraft including different sizes of a same model of aircraft and aircraft having winglets extending beyond the wingtip of the actual wing.

It would be advantageous to provide a method and a system for parking aircraft at a terminal of an airport that overcomes the above-mentioned limitations of the prior art.

OBJECT AND SUMMARY OF THE INVENTION

In order to overcome these and other limitations of the prior art, it is an object of the instant invention to provide a method and a system for parking aircraft at a terminal of an airport.

In accordance with an aspect of the instant invention there is provided a method for parking aircraft at an airport terminal having a plurality of passenger loading bridges, comprising the steps of: determining a type of an aircraft to be parked at the terminal; defining at the terminal a parking space having sufficient room for the aircraft of the determined type to park therein, such that at least a desired clearance is maintained between the aircraft of the determined type and all other aircraft parked at the terminal; and, moving a passenger loading bridge associated with the defined parking space so as to accommodate the determined type of an aircraft at the defined parking space while maintaining at least the desired clearance to all other aircraft parked at the terminal, wherein at different instances of time for different instances of the determined type of an aircraft, the associated passenger loading bridge is moved to substantially different locations to accommodate different defined parking spaces.

In accordance with another aspect of the instant invention there is provided a method for parking aircraft at an airport terminal having a plurality of passenger loading bridges, comprising the steps of: determining aircraft arrival information for aircraft that are scheduled to arrive at the terminal during a predetermined period of time; selecting a subset of aircraft that are to be parked at the terminal during a same overlapping period of time within the predetermined period of time; determining available space at the terminal during the same overlapping period of time; defining, for each aircraft of the subset of aircraft, a parking position within the available space, each defined parking position other than a predetermined centerline position associated with a passenger loading bridge, each parking position further defined such that at least a minimum spacing is maintained between adjacent aircraft; and, relatively moving passenger loading bridges at the terminal so that an aircraft-engaging end of each passenger loading bridge of the plurality of passenger loading bridges is positioned adjacent to a different defined parking position.

In accordance with still another aspect of the instant invention there is provided a system for parking aircraft at an airport terminal comprising: a database having stored therein aircraft arrival information relating to aircraft that are scheduled to arrive at the terminal during a predetermined period of time; a processor in communication with the database for defining aircraft parking positions within available parking spaces at the terminal, at least some of the defined aircraft parking positions being other than a predetermined centerline position associated with a passenger loading bridge at an available parking space, the aircraft parking positions further defined such that at least a minimum spacing is maintained between adjacent aircraft; and, a controller in communication with the processor, for receiving a signal indicative of the defined aircraft parking positions and for controlling an interaction between aircraft and passenger loading bridges and terminal operations such that the defined aircraft parking positions are implemented as actual parking positions for the aircraft.

In accordance with still another aspect of the instant invention there is provided a computer readable storage medium having stored therein program code for in execution performing a step of defining aircraft parking positions within available parking spaces at an airport terminal, at least some of the defined aircraft parking positions being other than a predetermined centerline position associated with a passenger loading bridge at one of the available parking spaces, such that at least a minimum spacing is maintained between adjacent aircraft.

BRIEF DESCRIPTION OF THE DRAWINGS

Exemplary embodiments of the invention will now be described in conjunction with the following drawings, in which similar reference numbers designate similar items.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. Throughout the disclosure, reference is made to three broad types of aircraft. It is to be understood that the term wide body aircraft refers to an aircraft of a size that is similar to that of a Boeing 747, the term narrow body aircraft refers to an aircraft of a size that is similar to that of a Boeing 737, and the term commuter jet aircraft refers to an aircraft of a size that is similar to that of a Canadair Regional Jet (CRJ).

Figure 1:
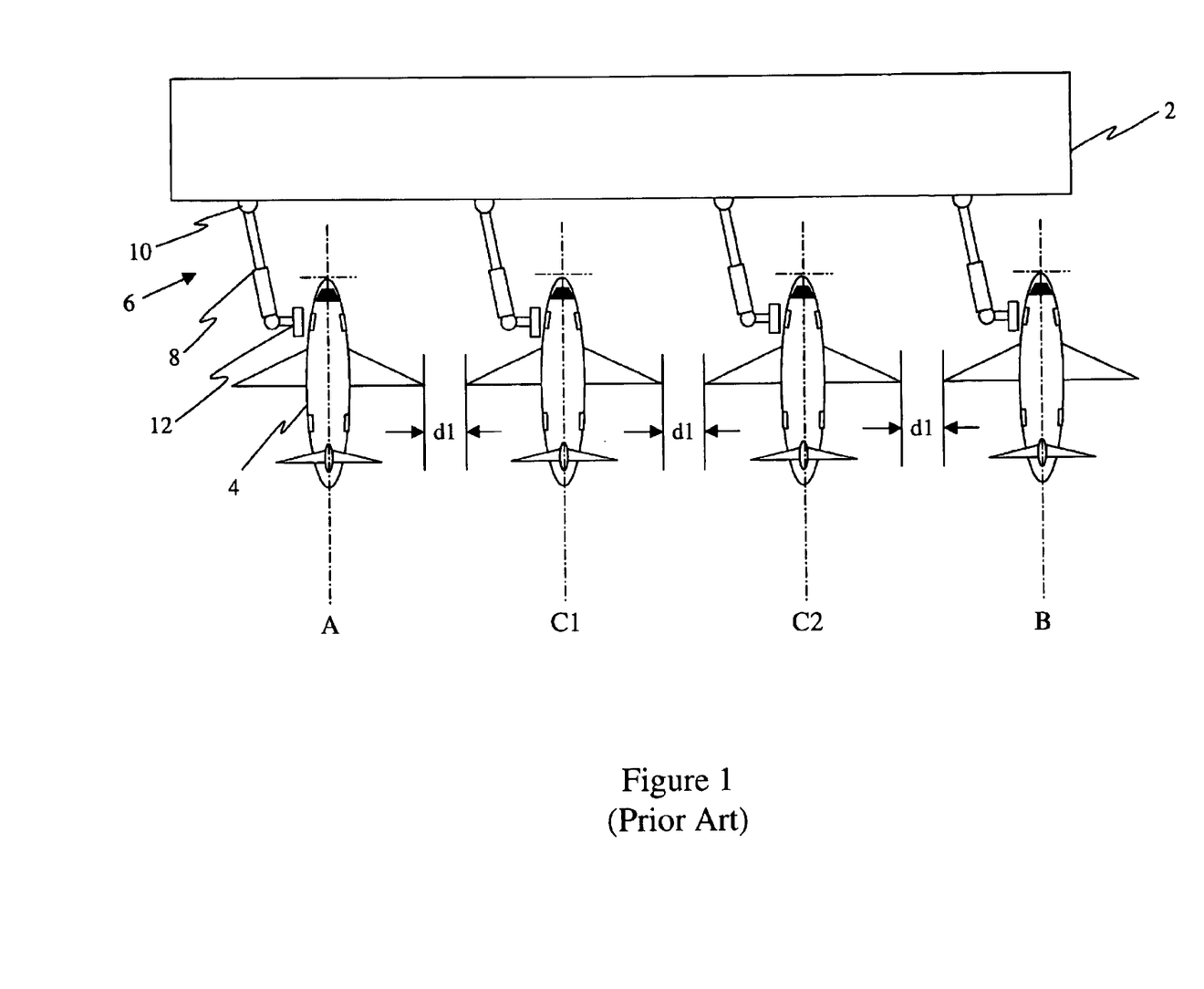
FIG. 1 is a schematic top view of an airport terminal building at which a plurality of narrow body aircraft is parked according to the prior art.

Referring to FIG. 1, shown is an airport terminal building 2 at which a plurality of aircraft is parked according to the prior art. The particular combination of aircraft that is illustrated in FIG. 1 is an example of a "most likely" anticipated usage situation as determined during an airport planning exercise. Stated differently, planning information was used to predict that four narrow body aircraft would most often be parked adjacent to the terminal building. For instance, each one of the four narrow body aircraft 4 is a Boeing 737. Based on this anticipated usage, the terminal building has been constructed such that the passenger loading bridges 6 are mounted as illustrated in FIG. 1. Each passenger loading bridge 6 includes a tunnel section 8 that is connected to the terminal building at one end via a rotunda 10, and that supports an aircraft-engaging interface 12 at a second end. Optionally, the aircraft-engaging interface 12 of at least some of the passenger loading bridges 6 is adapted to service a variety of different types of jet aircraft types, including commercial jet airliners and regional commuter jets.

Furthermore, predetermined parking positions A, B, C1 and C2 were determined during the planning stage such that a minimum required wingtip clearance d1 is maintained between adjacent parked aircraft. Throughout the disclosure, it is to be understood that the distance d1 represents a mandatory minimum spacing that must be maintained between the wingtips of adjacent aircraft parked at a terminal building. The minimum required wingtip clearance d1 is a same value for any two adjacent aircraft. Different airports may, however, mandate different minimum wingtip clearance. Of course, the distance that an aircraft parks from the terminal building 2 is dependent upon aircraft size. In particular, for airport terminal buildings where the passenger boarding bridge is attached at a second floor level, smaller aircraft park further away from the terminal building than do larger aircraft, such that a slope of the passenger loading bridge tunnel section 8 is less than or equal to 1:12, in compliance with the Americans With Disabilities Act (ADA).

Figure 2:
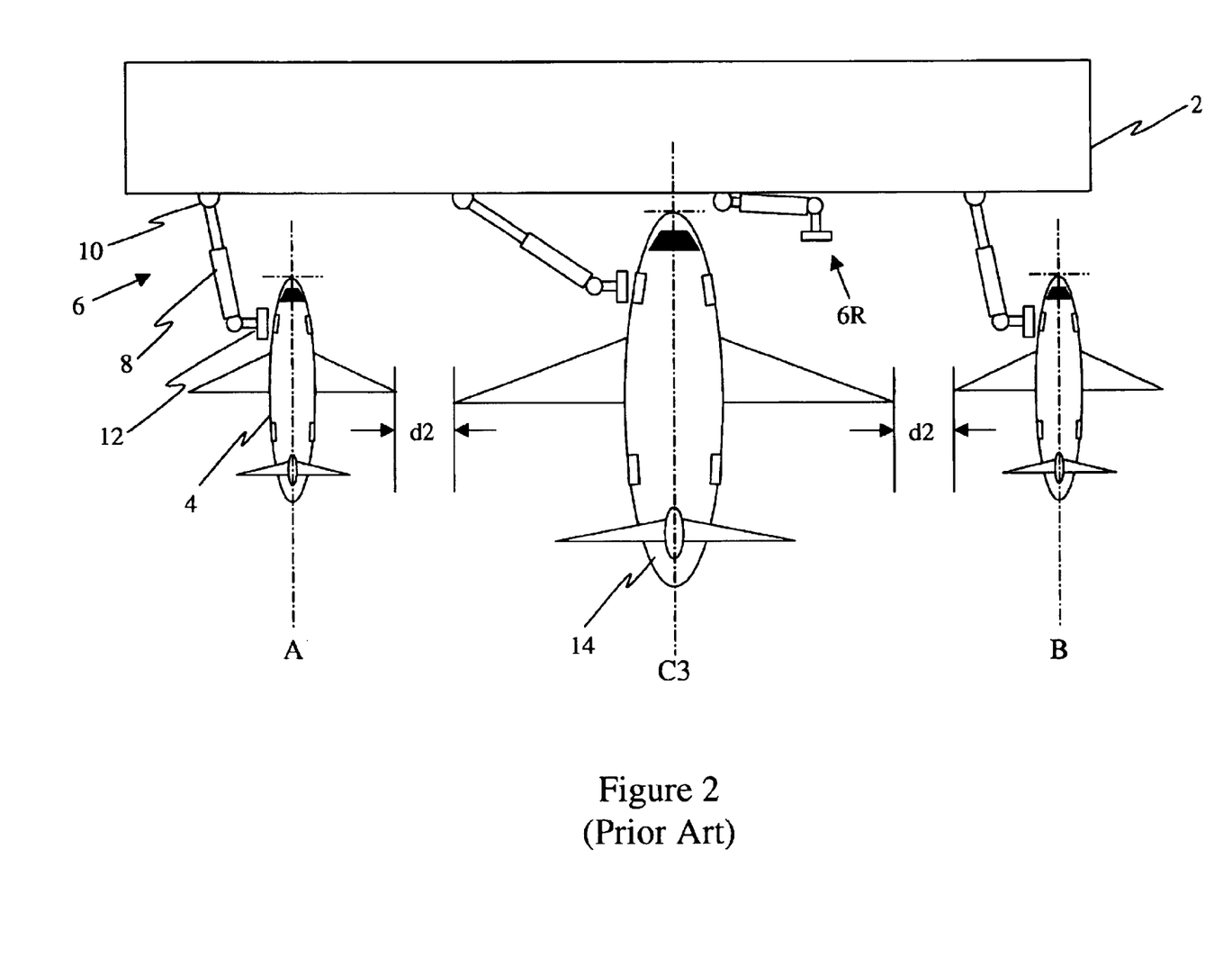
FIG. 2 is a schematic top view of the terminal building of FIG. 1 when a wide body aircraft is being serviced in addition to two narrow body aircraft.

Referring now to FIG. 2, shown is the terminal building 2 of FIG. 1 when a wide body aircraft 14 is being serviced in addition to two 737's. Elements labeled with the same numerals have the same function as those illustrated in FIG. 1. The smaller 737's park at the positions A and B, as was the case in FIG. 1. The wide body aircraft 14, for instance a Boeing 747, parks at a second central parking position C3 intermediate the positions C1 and C2. As discussed supra, the nose of the larger aircraft 14 approaches the terminal building more closely than does the nose of a narrow body aircraft 4. In the situation that is illustrated in FIG. 2, a wingtip clearance d2 is maintained between the wide body aircraft 14 and either one of the smaller 737's. In fact, the separation d2 is larger than the separation d1 between any two of the 737's illustrated in FIG. 1, however it is not generally a requirement that a larger wingtip clearance be provided between the wide body aircraft 14 and any other aircraft. Of course, in order to service the wide body aircraft 14 one of the four passenger loading bridges 6R has been taken out of service by being retracted toward the terminal building. Accordingly, the wide body aircraft 14 is occupying an amount of space that is normally occupied by two of the smaller narrow body aircraft. This is not a desirable situation, as other aircraft may be required to stand by until one of the aircraft moves away from the terminal building to make one of the passenger loading bridges available.

Figure 3:
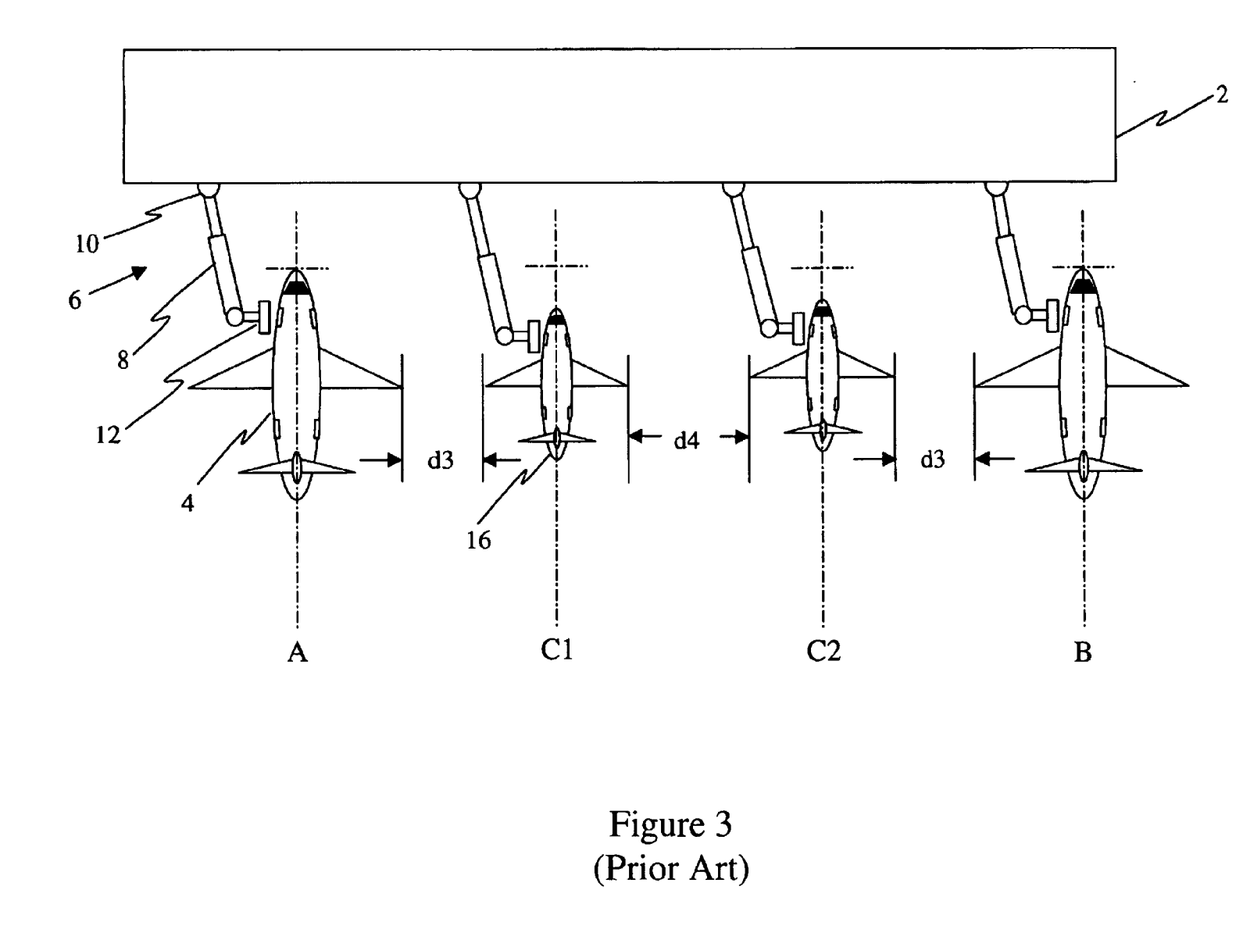
FIG. 3 is a schematic top view of the terminal building of FIG. 1 when two commuter jet aircraft are being serviced in addition to two narrow body aircraft.

Referring now to FIG. 3, shown is the terminal building 2 of FIG. 1 when two commuter jet aircraft are being serviced in addition to two 737's. Elements labeled with the same numerals have the same function as those illustrated in FIG. 1. The two commuter jet aircraft 16 are shown parked at positions C1 and C2, which positions were previously occupied by the two 737's of FIG. 1. For example, FIG. 3 illustrates a situation that arises when a type of aircraft that was not considered during the airport planning stage begins service at the airport. In the present example, the most appropriate lead-in lines for the commuter jets 16 are the lead-in lines C1 and C2 used by the narrow body 737's. As shown in FIG. 3, the most appropriate lead-in lines C1 and C2 do not allow for optimal utilization of the apron area adjacent the terminal building. For instance, the resulting wingtip clearance between a 737 and a commuter jet is d3 and the resulting wingtip clearance between the two commuter jets is d4, wherein d4 is greater than d3, and d3 is greater than the minimum required clearance d1. As the parking positions A, B, C1 and C2 shown in FIG. 3 are fixed, there is no flexibility to accommodate different sizes and/or different numbers of aircraft arriving from hour to hour or from day to day. Accordingly, optimal use of the apron area that is adjacent the terminal building 2 occurs only when a combination of aircraft as illustrated in FIG. 1 is being serviced.

The situation that is described with reference to FIGS. 1 to 3 illustrates that the prior art method of parking aircraft at an airport terminal works relatively well provided that the actual usage of the airport closely resembles the anticipated future usage. Unfortunately, as is shown in FIGS. 2 and 3, many combinations of aircraft being serviced at the airport result in a less than optimal utilization of the terminal facade, which indicates that the airport was designed to operate at less than full capacity. Of course, expanding the number of passenger loading bridges at the terminal building 2 gives rise to additional problems, as is described below.

Figure 4:
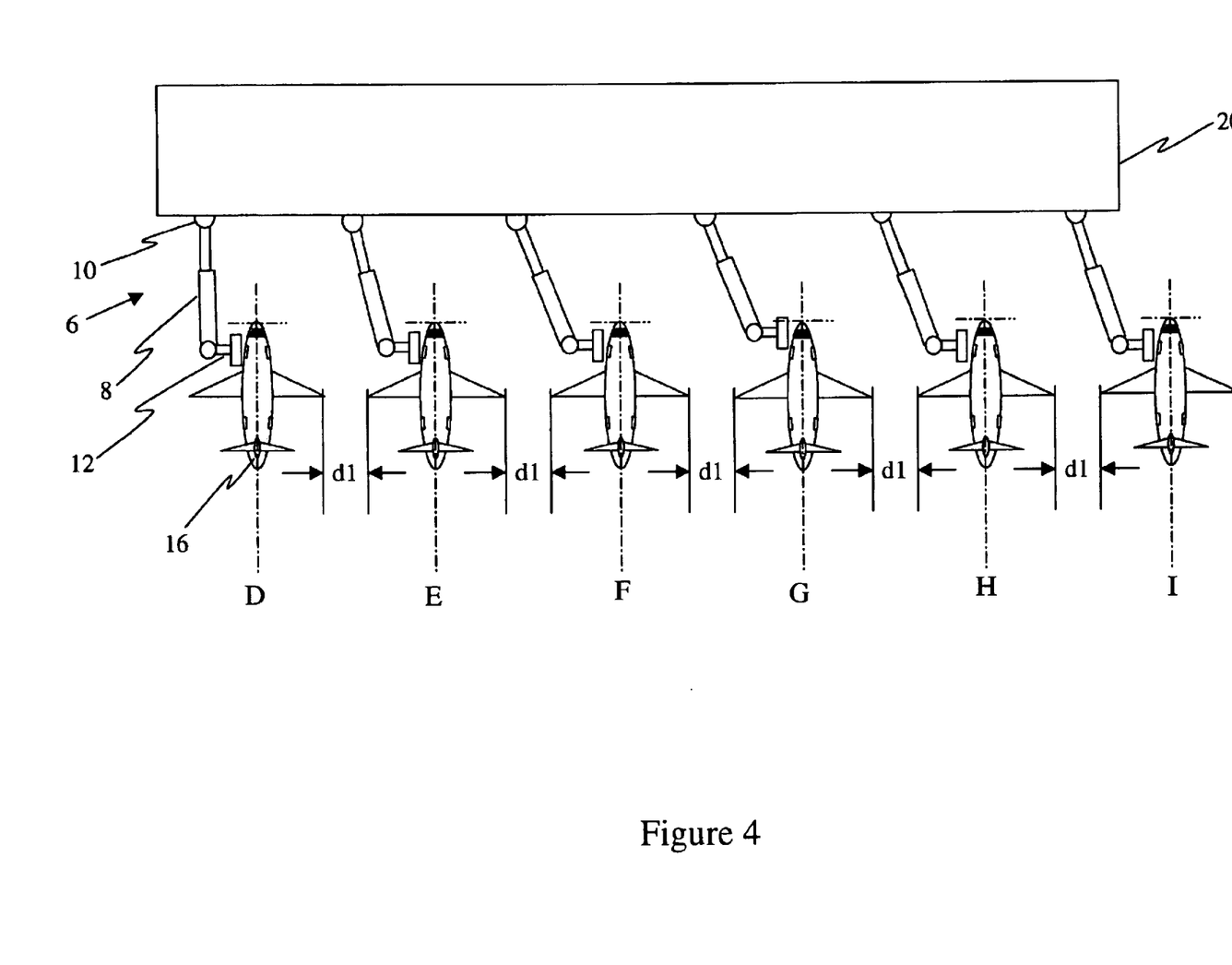
FIG. 4 is a schematic top view of a second terminal building at which a plurality of commuter jet aircraft is parked.

Referring now to FIG. 4, shown is a second terminal building 20 of a same size as the terminal building 2 illustrated in FIGS. 1 to 3. The particular combination of aircraft that is illustrated in FIG. 4 is an example of a different "most likely" anticipated usage situation that was determined during an airport planning exercise. Stated differently, planning information was used to predict that six small aircraft would most often be parked adjacent to the terminal building 20. For instance, each one of the six small aircraft 16 is a commuter jet aircraft, such as for example a Canadair Regional Jet (CRJ). Based on this anticipated usage, the terminal building 20 has been constructed such that the passenger loading bridges 6 are positioned as illustrated in FIG. 4 for servicing up to six commuter jet aircraft at a same time, the six commuter jet aircraft being parked at positions D to I. Accordingly, the wingtip clearance between any two adjacent commuter jet aircraft in FIG. 4 is approximately equal to the minimum required distance d1. Each passenger loading bridge 6 includes a tunnel section 8 that is connected to the terminal building at one end via a rotunda 10, and that supports an aircraft-engaging interface 12 at a second end. Optionally, the aircraft-engaging interface 12 of at least some of the passenger loading bridges 6 is adapted to service a variety of different types of aircraft, including commercial jet airliners and regional commuter jets. Of course, the spacing between adjacent passenger loading bridges 6 is smaller than the spacing of FIG. 1.

The scenario that is illustrated in FIG. 4 is possible with either the prior art method of parking aircraft, or with the method of parking aircraft according to the instant invention. In fact, the scenario depicted in FIG. 4 merely shows one possible arrangement for parking six aircraft of a same size at a terminal building 20 in a manner that optimizes utilization of the apron area adjacent to the terminal building.

Figure 5:
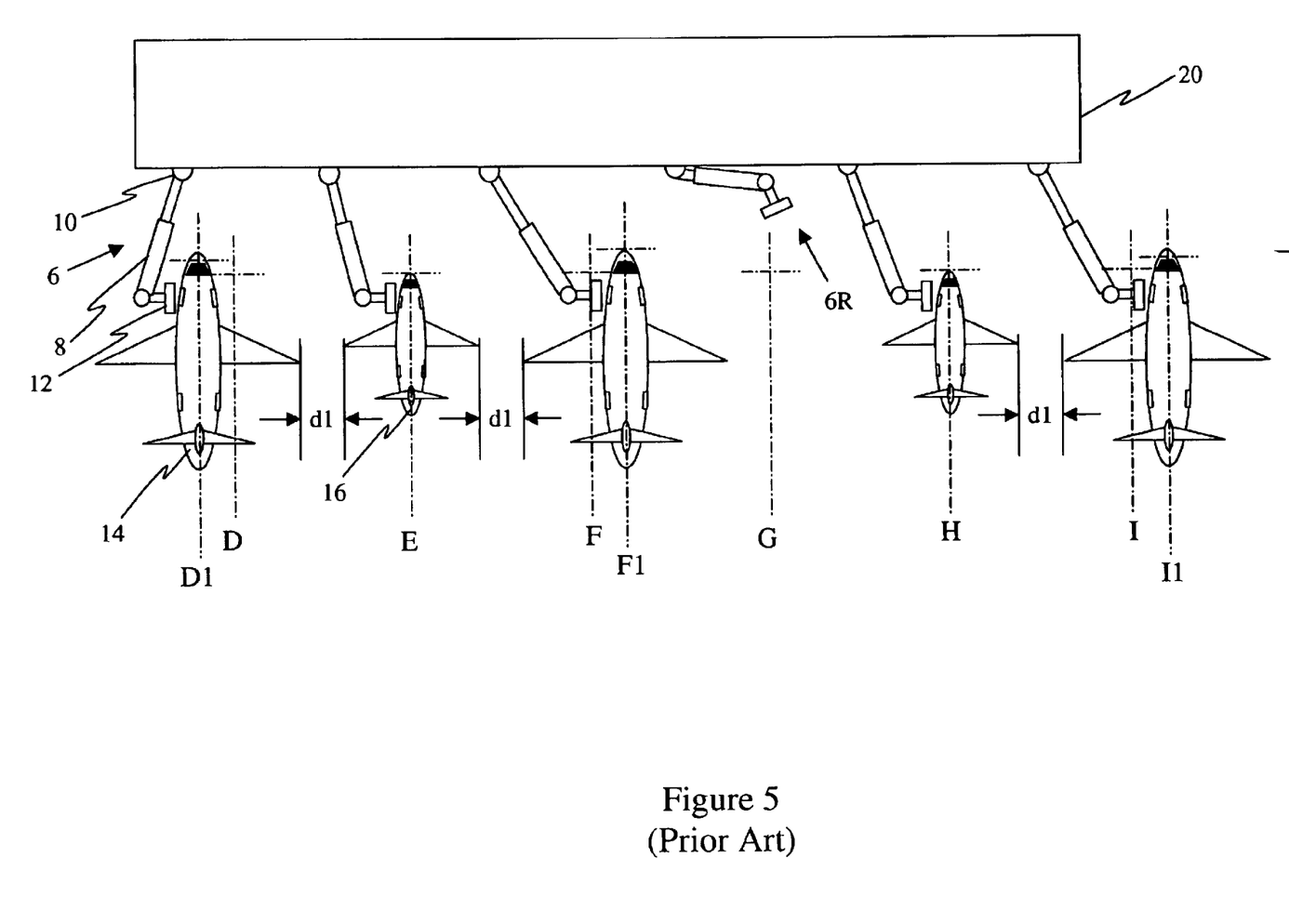
FIG. 5 is a schematic diagram of three narrow body aircraft and two commuter jet aircraft parked according to the prior art at the terminal building of FIG. 4.

Referring now to FIG. 5, shown is a schematic illustration of three narrow body aircraft and two commuter jet aircraft parked according to the prior art at the terminal building 20 of FIG. 4. Elements labeled with the same numerals have the same function as those illustrated in FIG. 4. According to the prior art, a single lead in line is provided for each type of aircraft, such that for different instances of a same type of aircraft at a same passenger loading bridge, the same type of aircraft always stops at a same final parking position. As such, the two commuter jet aircraft 16 are shown in FIG. 5 at final parking positions E and H. Of course, a separate lead in line is provided for a narrow body aircraft 14 at each parking position. Accordingly, the three narrow body aircraft park at final parking positions D1, F1 and I1. Furthermore, the passenger loading bridge 6R at position G is taken out of service, since there is insufficient space to park an aircraft adjacent to bridge 6R while maintaining the minimum required wingtip clearance d1 to the aircraft at positions F1 and H. It is a limitation of the prior art method that a single lead-in line is provided for each type of aircraft, such that taking a passenger loading bridge out of service is the only option available when there is insufficient space available to accommodate an aircraft at a corresponding parking position. In particular, the prior art method does not allow for aircraft that are assigned to the adjacent gate areas to be shifted further away from parking position G in order to create more space at position G. Instead, the aircraft that are assigned to the adjacent gate areas are constrained to park at a predetermined parking position only.

Figure 6:
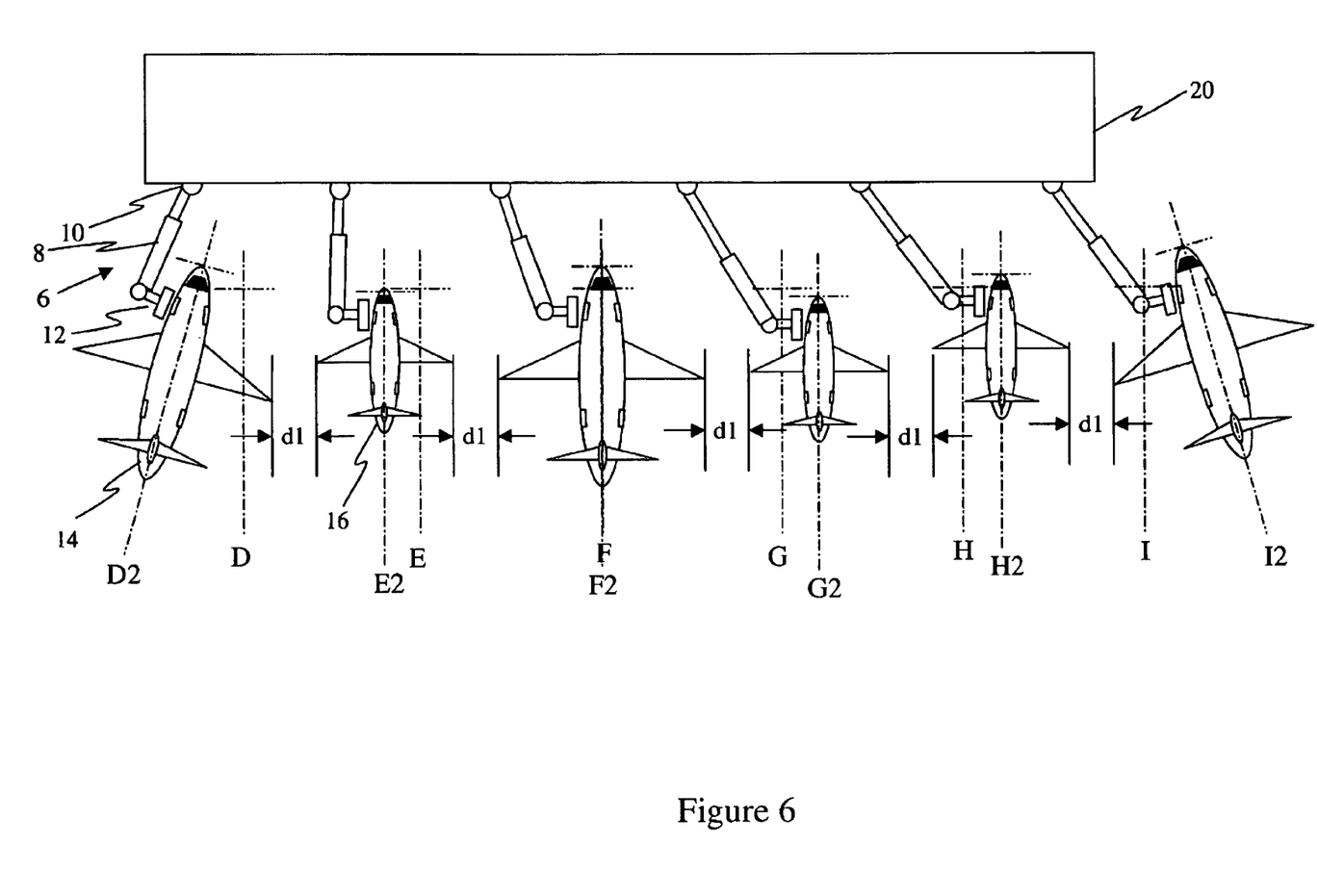
FIG. 6 is a schematic illustration of three narrow body aircraft and three commuter jet aircraft parked according to the instant invention at the terminal building of FIG. 4.

Referring now to FIG. 6, shown is a schematic illustration of three narrow body aircraft and three commuter jet aircraft parked according to the instant invention at the terminal building of FIG. 4. Elements labeled with the same numerals have the same function as those illustrated in FIG. 4. As shown in FIG. 6, the parking position of each aircraft is shifted to an optimal position, such that a minimum wingtip clearance of d1 is provided to either side of every aircraft. In particular, two of the narrow body 737's are "angle parked", one each at positions D2 and I2. The other parking positions E, G and H are shifted to positions E2, G2 and H2, respectively, while parking position F2 is substantially coincident with parking position F. It is to be understood that the parking positions that are illustrated in FIG. 6 have been labeled in order to facilitate an understanding of the instant invention. Furthermore, the aircraft are not constrained to park only at the parking positions that are illustrated in FIG. 6. For example, the position D2 represents only one possible parking position for a narrow body aircraft based upon one of a current and a future combination of aircraft parked at the airport terminal. In fact, a same aircraft returning to a same gate area may be instructed to park at a different parking position upon each different arrival. Advantageously, by optimizing the parking position for each different aircraft it is possible to accommodate all three 737's and the three commuter jet aircraft, without requiring any of the six passenger loading bridges to be taken out of service. Accordingly, none of the terminal capacity is wasted when the aircraft are parked as shown in FIG. 6 according to the instant invention.

According to the above embodiment of the instant invention, the final parking position of an aircraft at the airport terminal building is flexible. In this way, an aircraft may be instructed to park further away from an adjacent aircraft in order to ensure that a minimum wingtip clearance of d1 is maintained at all times. Optionally, the final parking position is selected from a continuum of possible final parking positions adjacent a passenger loading bridge. In other words, the aircraft may be instructed to park at any position provided that the passenger loading bridge is capable of being aligned to a doorway of the aircraft. Further optionally, a plurality of discrete final parking positions is defined adjacent to each passenger loading bridge for each type of aircraft. For example, ten possible parking positions for a wide body aircraft are defined, twenty possible parking positions for a narrow body aircraft are defined, and 25 possible parking positions for a commuter jet aircraft are defined. Of course, some parking positions may be substantially identical for different types of aircraft. Subsequently, an aircraft is instructed to park at a particular one of the possible parking positions for that type of aircraft. For example, the particular one of the possible parking positions is selected taking into account a number and type of adjacent aircraft, such that a wingtip clearance of approximately d1 is provided to either side of the aircraft. In both cases, it is preferable that the aircraft parks such that wingtip clearances do not substantially exceed d1, which would result in wasted space on the apron.

It is to be understood that parking aircraft at an airport using variable final parking positions is a departure from the prior art. For example, the prior art method of parking aircraft at an airport relies upon permanent lead-in lines and stop lines for guiding the aircraft to a predetermined parking position. The lead-in lines cannot be altered, except by removing the original lead-in lines and painting fresh lead-in lines in their place. Accordingly, aircraft of a same type must always approach a same final parking position by following a same predetermined trajectory along a corresponding lead-in line for that parking position. If the aircraft fails to stop precisely at the predetermined parking position, then it may prove to be extraordinarily time consuming, or even impossible, to align the passenger loading bridge with a doorway of the aircraft. In that case, it may be necessary to tow the aircraft away from the terminal building and re-position it closer to its predetermined parking position. As such, when gate assignments are being made using the prior art method the only way to optimize usage of the passenger loading bridges is to group aircraft of similar size at adjacent bridges and/or when space permits to assign the largest aircraft to a bridge that does not have an adjacent bridge on one side and/or put an adjacent bridge out of service.

Figure 7:
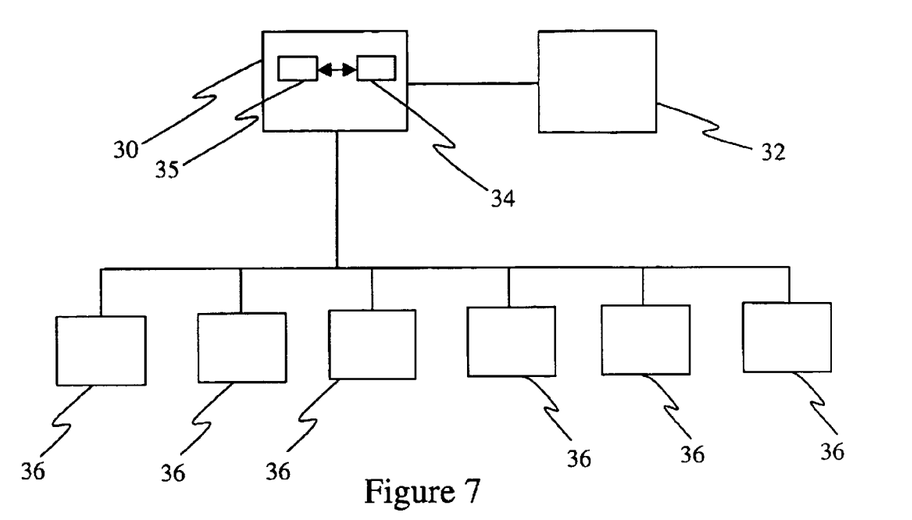
FIG. 7 is a simplified block diagram of a system according to the instant invention for parking aircraft at an airport.

Referring now to FIG. 7, shown is a simplified block diagram of a system according to the instant invention for parking aircraft at an airport. The system includes a controller 30, such as for instance a computer within a terminal building of the airport. The controller 30 is in communication with a database 32, such as for example a flight information database including information relating to expected arrival times of scheduled flights, types of aircraft scheduled to arrive, etc. The controller 30 also includes a processor 34 in communication with a memory circuit or another computer readable storage medium 35 having stored therein program code for, when in execution on the processor 34, determining parking positions for aircraft based upon information provided by the database 32. For instance, the program code is for in execution performing a step of defining aircraft parking positions within available parking spaces at a terminal building of the airport, at least some of the defined aircraft parking positions being other than a predetermined centerline position associated with a passenger loading bridge at one of the available parking spaces, such that at least a minimum spacing is maintained between adjacent aircraft. The controller 30 is also in communication with a plurality of bridge controllers, each bridge controller 36 for controlling one corresponding passenger loading bridge (not shown).

In operation, the controller 30 retrieves information relating to aircraft that are expected to arrive at the airport within a predetermined period of time. For instance, the controller retrieves information relating to a next twenty-four hour period. The information is provided to the processor 34 and is analyzed using program code retrieved from the memory 35. Based upon the results of the analysis and other data relating to the airport, parking positions are determined for aircraft arriving within the predetermined period of time. For example, the information is analyzed to determine a peak demand at the airport. The types of aircraft that are expected to arrive during the peak demand are determined, and each aircraft that is expected during the peak demand is assigned to a parking position such that usage of the parking area is optimized. For instance, a wingtip clearance between any two aircraft when parked must exceed the minimum required clearance d1 by a minimal amount. Optionally, the assigned parking positions are selected from a plurality of predetermined parking positions for a same type of aircraft at a same passenger loading bridge. Further optionally, the assigned parking positions are selected from a continuum of parking positions adjacent to a passenger loading bridge.

After an aircraft parking position at a particular passenger loading bridge has been determined, the processor 34 provides a control signal to the bridge controller 36 of the particular passenger loading bridge. The control signal is for use by the bridge controller 36 for moving an aircraft-engaging end of the passenger loading bridge to a position adjacent to the determined aircraft parking position. For example, the control signal includes a set of coordinates for adjusting the horizontal and vertical position of the aircraft-engaging end of the passenger loading bridge. The positions of other passenger loading bridges are optionally adjusted in a similar manner.

When an aircraft subsequently arrives at the airport, the pilot taxis the aircraft toward the determined parking position at an assigned gate. The pilot stops the aircraft such that a doorway of the aircraft is substantially aligned with the aircraft-engaging end of the passenger loading bridge. Suitable methods and systems for accurately positioning an aircraft adjacent to an aircraft-engaging end of a passenger loading bridge are described in provisional application U.S. Pat. No. 60/400,785, filed on Aug. 5 2002, which is incorporated herein by reference. For example, the system for providing feed back to the pilot includes one of a visual guidance docking system and a wand indicator carried by a support arm for positioning the wand to indicate a desired aircraft parking position. Advantageously, the aircraft-engaging end of the passenger loading bridge requires only a relatively minor final adjustment in order to mate to the doorway of the parked aircraft. The final adjustment does not contribute substantially to aircraft turnaround times and does not cause undue inconvenience to passengers aboard the aircraft. Prior to the aircraft moving away from the passenger loading bridge, the bridge controller 36 returns the aircraft-engaging end of the passenger loading bridge to the position adjacent to the determined aircraft parking position. For example, the bridge controller 36 uses the previously provided set of coordinates for adjusting the horizontal and vertical position of the aircraft-engaging end of the passenger loading bridge. Optionally, the bridge controller receives a second control signal from the processor 34 prior to the aircraft moving away from the passenger loading bridge. The second control signal includes a second set of coordinates for adjusting the horizontal and vertical position of the aircraft-engaging end of the passenger loading bridge to a second other position.

Further optionally, aircraft parking positions are determined at intervals that cover other than twenty-four hour periods of time. For instance, the parking positions are determined and/or optimized on an hourly basis and the positions of the passenger loading bridges are adjusted accordingly. Further optionally, the process is substantially continuous, with relatively minor adjustments occurring between a departure of a first aircraft and an arrival of a second aircraft, as was described above. Preferably, such minor adjustments are made taking into account other aircraft arriving at a later time, such that large corrections are avoided.

Of course, the final adjustments to mate the aircraft-engaging end of the passenger loading bridge to the doorway of the aircraft are optionally performed using one of a manual, semi-automated and fully automated bridge alignment system.

Figure 8:
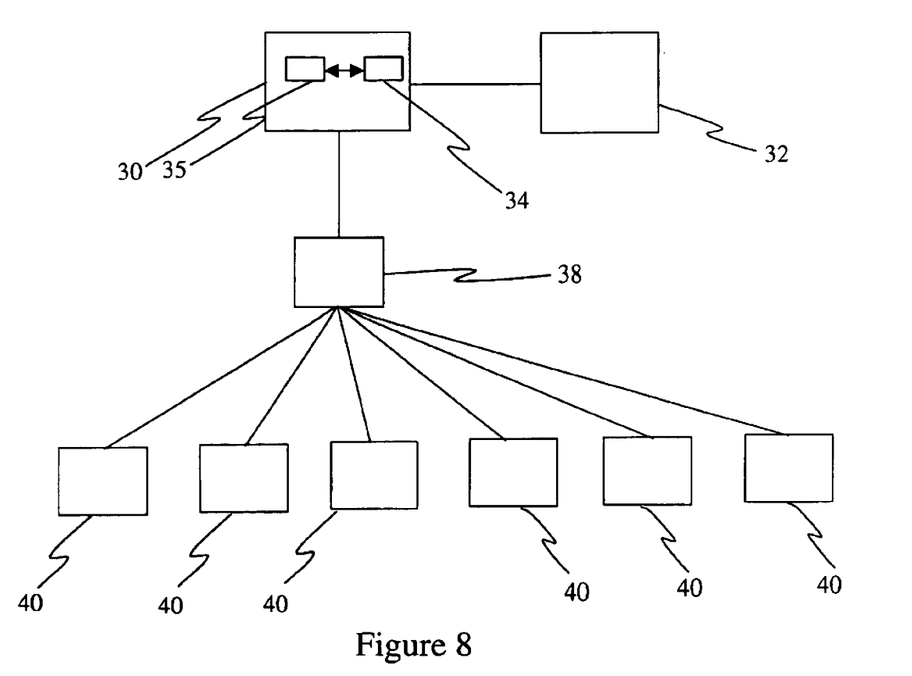
FIG. 8 is a simplified block diagram of another system according to the instant invention for parking aircraft at an airport.

Referring now to FIG. 8, shown is a simplified block diagram of another system according to the instant invention for parking aircraft at an airport. The system includes a controller 30, such as for instance a computer within a terminal building of the airport. The controller 30 is in communication with a database 32, such as for example a flight information database including information relating to expected arrival times of scheduled flights, types of aircraft scheduled to arrive, etc. The controller 30 also includes a processor 34 in communication with a memory circuit or another computer readable storage medium 35 having stored therein program code for, when in execution on the processor 34, determining parking positions for aircraft based upon information provided by the database 32. For instance, the program code is for in execution performing a step of defining aircraft parking positions within available parking spaces at a terminal building of the airport, at least some of the defined aircraft parking positions being other than a predetermined centerline position associated with a passenger loading bridge at one of the available parking spaces, such that at least a minimum spacing is maintained between adjacent aircraft. The controller 30 is also in communication with a centralized bridge controller 38, the centralized bridge controller 38 for providing a control signal to a drive system 40 of each one of a plurality of passenger loading bridges. Optionally, the centralized bridge controller 38 is an integral part of the controller 30.

In operation, the controller 30 retrieves information relating to aircraft that are expected to arrive at the airport within a predetermined period of time. For instance, the controller retrieves information relating to a next twenty-four hour period. The information is provided to the processor 34 and is analyzed using program code retrieved from the memory 35. Based upon the results of the analysis and other data relating to the airport, parking positions are determined for aircraft arriving within the predetermined period of time. For example, the information is analyzed to determine a peak demand at the airport. The types of aircraft that are expected to arrive during the peak demand are determined, and each aircraft that is expected during the peak demand is assigned to a parking position such that usage of the parking area is optimized. For instance, a wingtip clearance between any two aircraft when parked must exceed the minimum required clearance d1 by a minimal amount. Optionally, the assigned parking positions are selected from a plurality of predetermined parking positions for a same type of aircraft at a same passenger loading bridge. Further optionally, the assigned parking positions are selected from a continuum of parking positions adjacent to a passenger loading bridge.

After an aircraft parking position at a particular passenger loading bridge has been determined, the processor 34 provides a control signal to the centralized bridge controller 38. The control signal is for use by the centralized bridge controller 38 for moving an aircraft-engaging end of one passenger loading bridge of the plurality of passenger loading bridges to a position adjacent to the determined aircraft parking position. For example, the control signal includes a set of coordinates for adjusting the horizontal and vertical position of the aircraft-engaging end of the passenger loading bridge. The positions of other passenger loading bridges are optionally adjusted in a similar manner, for instance in dependence upon other control signals.

When an aircraft subsequently arrives at the airport, the pilot taxis the aircraft toward the determined parking position at an assigned gate. The pilot stops the aircraft such that a doorway of the aircraft is substantially aligned with the aircraft-engaging end of the passenger loading bridge. Suitable methods and systems for accurately positioning an aircraft adjacent to an aircraft-engaging end of a passenger loading bridge are described in provisional application U.S. Pat. No. 60/400,785, filed on Aug. 5, 2002, which is incorporated herein by reference. For example, the system for providing feed back to the pilot includes one of a visual guidance docking system and a wand indicator carried by a support arm for positioning the wand to indicate a desired aircraft parking position. Advantageously, the aircraft-engaging end of the passenger loading bridge requires only a relatively minor final adjustment in order to mate to the doorway of the parked aircraft. The final adjustment does not contribute substantially to aircraft turnaround times and does not cause undue inconvenience to passengers aboard the aircraft. Prior to the aircraft moving away from the passenger loading bridge, the centralized bridge controller 38 returns the aircraft-engaging end of the passenger loading bridge to the position adjacent to the determined aircraft parking position. For example, the centralized bridge controller 38 uses the previously provided set of coordinates for adjusting the horizontal and vertical position of the aircraft-engaging end of the passenger loading bridge. Optionally, the centralized bridge controller 38 receives a second control signal from the processor 34 prior to the aircraft moving away from the passenger loading bridge. The second control signal includes a second set of coordinates for adjusting the horizontal and vertical position of the aircraft-engaging end of the passenger loading bridge to a second other position.

Further optionally, aircraft parking positions are determined at intervals that cover other than twenty-four hour periods of time. For instance, the parking positions are determined and/or optimized on an hourly basis and the positions of the passenger loading bridges are adjusted accordingly. Further optionally, the process is substantially continuous, with relatively minor adjustments occurring between a departure of a first aircraft and an arrival of a second aircraft, as was described above. Preferably, such minor adjustments are made taking into account other aircraft arriving at a later time, such that large corrections are avoided.

Of course, the final adjustments to mate the aircraft-engaging end of the passenger loading bridge to the doorway of the aircraft are optionally performed using one of a manual, semi-automated and fully automated bridge alignment system.

Figure 9:
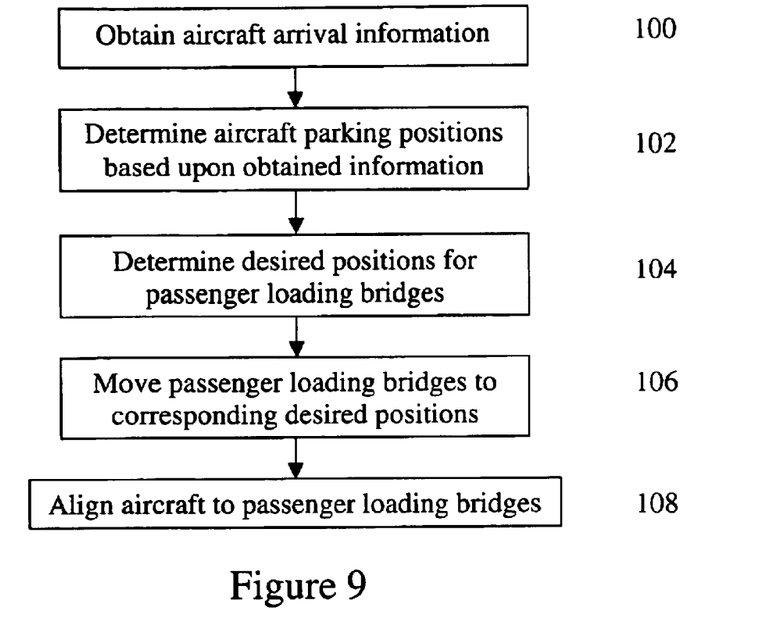
FIG. 9 is a simplified flow diagram of a method for positioning passenger loading bridges at an airport in order to service aircraft that park at variable parking positions.

Referring now to FIG. 9, shown is a simplified flow diagram of a method for parking aircraft at an airport. As described above, program code for in execution performing the individual method steps is stored within the computer readable storage medium 35. At step 100 aircraft arrival information is obtained. For instance, data relating to a type and/or model for each aircraft of a plurality of aircraft that is scheduled to arrive at the airport is retrieved from the database 32. At step 102 aircraft parking positions for each aircraft of the plurality of aircraft are determined based upon the obtained aircraft arrival information and supplemental information relating to the aircraft types and/or models. The processor 34 iteratively adjusts parking scenarios to determine an optimized parking position for each aircraft of the plurality of aircraft. Parking parameters including a distance from the terminal building, angle of passenger loading bridge away from the terminal building and parking angle of the aircraft relative to the terminal building are varied in order to allow a maximum number of aircraft to park during a same overlapping period of time whilst maintaining the minimum wingtip clearance d1. Once the parking position for each aircraft of the plurality of aircraft is determined, corresponding positions for the passenger loading bridges are determined at step 104. The corresponding positions are determined such that the aircraft stops at its determined parking position when the pilot taxis the aircraft up to the passenger loading bridge. At step 106 the passenger loading bridges are moved to the corresponding positions. For example, a bridge controller provides a control signal to a bridge drive mechanism (not shown) to cause the passenger loading bridge to move to the corresponding position. At step 108 the aircraft is aligned to the passenger loading bridge. For instance, the pilot taxis the aircraft along a trajectory leading generally toward the aircraft-engaging end of the passenger loading bridge. Optionally, the pilot receives feedback from a guidance system to ensure that the aircraft arrives at the determined parking position absent permanent markings or lead-in lines being provided. Several suitable systems for providing feedback to the pilot are disclosed in provisional application U.S. Pat. No. 60/400,785, filed on Aug. 5, 2002. For example, the system for providing feed back to the pilot includes one of a visual guidance docking system and a wand indicator carried by a support arm for positioning the wand to indicate a desired aircraft parking position. Preferably, the final adjustment for mating the aircraft-engaging end of the passenger loading bridge to a doorway of the aircraft is accomplished by linearly extending the passenger loading bridge a distance of one to three meters from the corresponding position in a direction toward the aircraft. Optionally, the final adjustment is performed using one of a manual, a semi-automated and a fully automated bridge alignment system.

Figure 10:
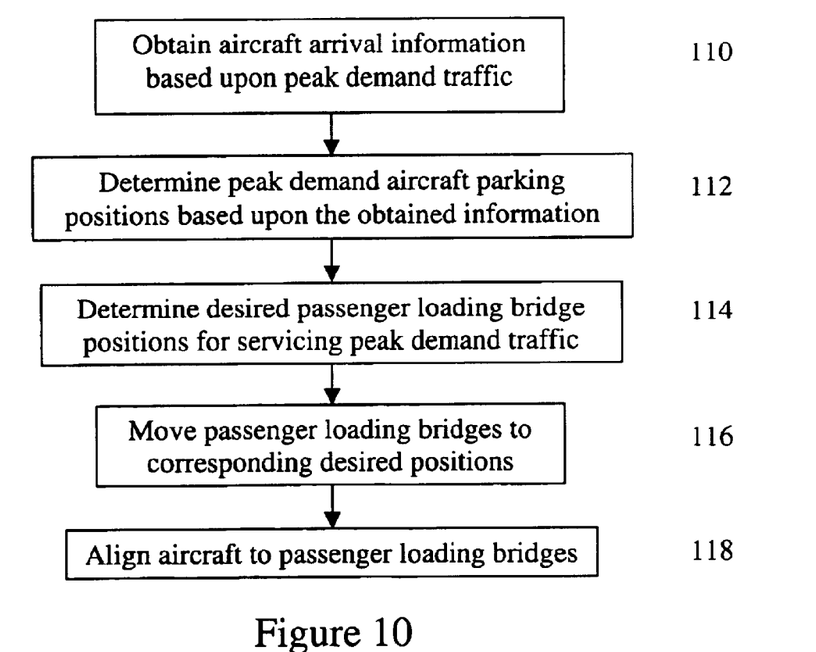
FIG. 10 is a simplified flow diagram of a method for positioning passenger loading bridges at an airport in order to service aircraft that arrive at a peak traffic time and park at variable parking positions; and, FIG. 11 is a simplified flow diagram of a method for accommodating an additional aircraft at an airport terminal parking area.

Referring now to FIG. 10, shown is a simplified flow diagram of another method for parking aircraft at an airport. As described above, program code for in execution performing the individual method steps is stored within the computer readable storage medium 35. At step 110 aircraft arrival information is obtained for a period of peak demand traffic at the airport. For instance, data relating to a type and/or model for each aircraft of a plurality of aircraft that is scheduled to arrive at the airport during the peak demand time is retrieved from the database 32. The peak demand time is optionally defined as a time period during which there is expected to be a greatest demand for aircraft parking space at the airport terminal building. For instance, peak demand occurs when an unusually large number of aircraft arrive during a short period of time, or when several wide body aircraft arrive at a same time, each wide body aircraft requiring more parking space compared to a smaller narrow body aircraft or a commuter jet aircraft. At step 112 aircraft parking positions for each aircraft of the plurality of aircraft are determined based upon the obtained aircraft arrival information for the period of peak demand traffic and supplemental information relating to the aircraft types and/or models. The processor 34 iteratively adjusts parking scenarios to determine an optimized parking position for each aircraft of the plurality of aircraft. Parking parameters including a distance from the terminal building, angle of passenger loading bridge away from the terminal building and parking angle of the aircraft relative to the terminal building are varied in order to allow a maximum number of aircraft to park during the peak demand time whilst maintaining the minimum wingtip clearance d1. Once the parking position for each aircraft of the plurality of aircraft is determined, corresponding positions for the passenger loading bridges are determined at step 114. The corresponding positions are determined such that the aircraft stops at its determined parking position when the pilot taxis the aircraft up to the passenger loading bridge. At step 116 the passenger loading bridges are moved to the corresponding positions. For example, a bridge controller provides a control signal to a bridge drive system to cause the passenger loading bridge to move to the corresponding position. At step 118 the aircraft is aligned to the passenger loading bridge. For instance, the pilot taxis the aircraft along a trajectory leading generally toward the aircraft-engaging end of the passenger loading bridge. Optionally, the pilot receives feedback from a guidance system to ensure that the aircraft arrives at the determined parking position absent permanent markings or lead-in lines being provided. Several suitable systems for providing feedback to the pilot are disclosed in provisional application U.S. Pat. No. 60/400,785, filed on Aug. 5, 2002. For example, the system for providing feed back to the pilot includes one of a visual guidance docking system and a wand indicator carried by a support arm for positioning the wand to indicate a desired aircraft parking position. Preferably, the final adjustment for mating the aircraft-engaging end of the passenger loading bridge to a doorway of the aircraft is accomplished by linearly extending the passenger loading bridge a distance of one to three meters from the corresponding position in a direction toward the aircraft. Optionally, the final adjustment is performed using one of a manual, a semi-automated and a fully automated bridge alignment system.

Figure 11:
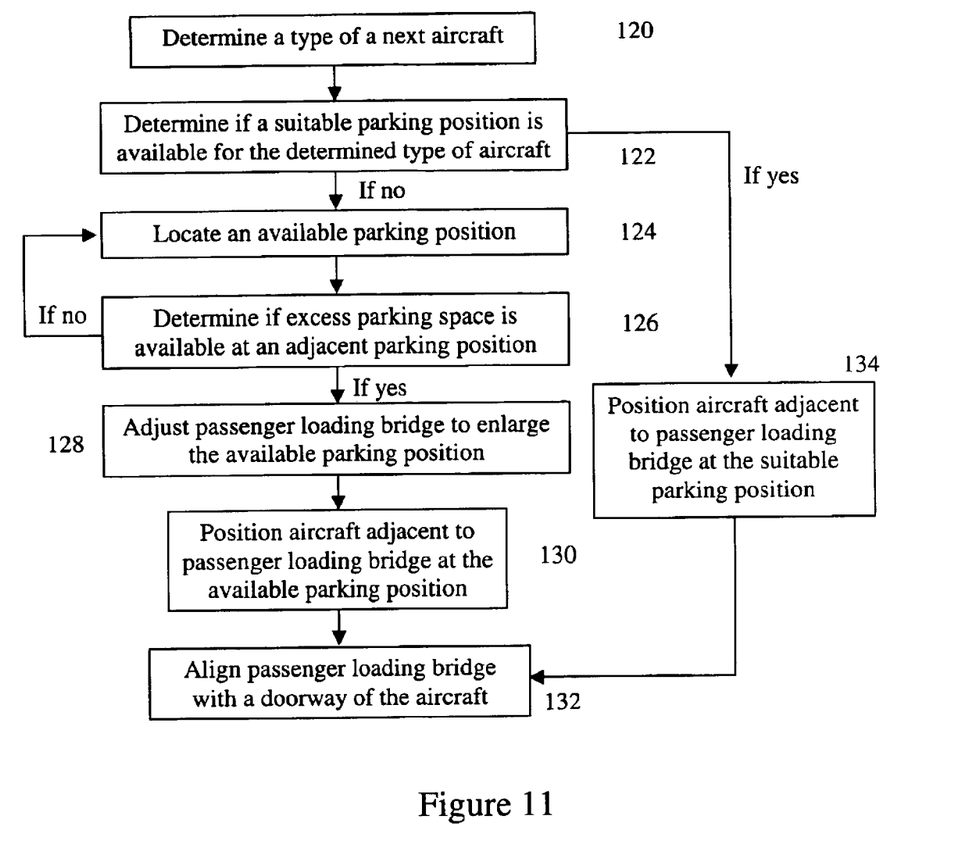

Referring now to FIG. 11, shown is a simplified flow diagram of yet another method for parking aircraft at an airport. As described above, program code for in execution performing the individual method steps is stored within the computer readable storage medium 35. The method of FIG. 11 is for making gate assignments and optimizing parking positions of aircraft on a substantially continuous basis. At step 120 a type of a next aircraft that is scheduled to arrive at the airport is determined. For example, data relating to the type and/or model of the next aircraft is retrieved from the database 32. At decision step 122 it is determined if a suitable parking position is available for the type of the next aircraft. In particular, a suitable parking position is one at which the type of the next aircraft maintains the minimum required wingtip clearance of d1. If it is determined at step 122 that a suitable parking position is available, then at step 134 the aircraft is taxied up to a passenger loading bridge associated with the suitable parking position. For instance, the pilot taxis the aircraft along a trajectory leading generally toward the aircraft-engaging end of the passenger loading bridge. Optionally, the pilot receives feedback from a guidance system to ensure that the aircraft arrives at the suitable parking position absent permanent markings or lead-in lines being provided. Several suitable systems for providing feedback to the pilot are disclosed in provisional application U.S. Pat. No. 60/400,785, filed on Aug. 5, 2002. For example, the system for providing feed back to the pilot includes one of a visual guidance docking system and a wand indicator carried by a support arm for positioning the wand to indicate a desired aircraft parking position. At step 132 the passenger loading bridge is aligned with a doorway of the aircraft. Preferably, the final adjustment for mating the aircraft-engaging end of the passenger loading bridge to a doorway of the aircraft is accomplished by linearly extending the passenger loading bridge a distance of one to three meters in a direction toward the aircraft. Optionally, the final adjustment is performed using one of a manual, a semi-automated and a fully automated bridge alignment system.

If it is determined instead at step 122 that no suitable parking positions are available, then an attempt is made to create a suitable parking position by optimizing usage of existing parking space. In particular, at step 124 an available parking position is located. At step 126 it is determined whether or not one of the parking positions adjacent to the available parking position has "excess parking space" that can be borrowed temporarily in order to accommodate the next aircraft. For instance, if a small aircraft is parked adjacent to the available parking position, then it may be possible at step 128 to move the passenger loading bridge at the available parking position in a direction toward the small aircraft, thereby enlarging the available parking position temporarily. Of course, if no "excess parking space" is available at the adjacent parking positions, then step 124 is repeated to select another available parking position. At step 130 the aircraft is taxied up to the passenger loading bridge associated with the available parking position. For instance, the pilot taxis the aircraft along a trajectory leading generally toward the aircraft-engaging end of the passenger loading bridge. Optionally, the pilot receives feedback from a guidance system to ensure that the aircraft arrives at the suitable parking position absent permanent markings or lead-in lines being provided. Several suitable systems for providing feedback to the pilot are disclosed in provisional application U.S. Pat. No. 60/400,785, filed on Aug. 5, 2002. For example, the system for providing feed back to the pilot includes one of a visual guidance docking system and a wand indicator carried by a support arm for positioning the wand to indicate a desired aircraft parking position. At step 132 the passenger loading bridge is aligned with a doorway of the aircraft. Preferably, the final adjustment for mating the aircraft-engaging end of the passenger loading bridge to a doorway of the aircraft is accomplished by linearly extending the passenger loading bridge a distance of one to three meters in a direction toward the aircraft. Optionally, the final adjustment is performed using one of a manual, a semi-automated and a fully automated bridge alignment system.

Numerous other embodiments may be envisaged without departing from the spirit and scope of the invention.

What is claimed is:

1. A method for parking aircraft at an airport terminal having a plurality of passenger loading bridges, comprising the steps of:
   determining a type of an aircraft to be parked at the terminal;
   defining at the terminal a parking space having sufficient room for the aircraft of the determined type to park therein, such that at least a desired clearance is maintained between the aircraft of the determined type and all other aircraft parked at the terminal; and,
   moving a passenger loading bridge associated with the defined parking space so as to accommodate the determined type of an aircraft at the defined parking space while maintaining at least the desired clearance to all other aircraft parked at the terminal, wherein at different instances of time for different instances of the determined type of an aircraft, the associated passenger loading bridge is moved to substantially different locations to accommodate different defined parking spaces.

2. A method according to claim 1 including the step of parking the aircraft of the determined type adjacent to the passenger loading bridge associated with the defined parking space.

3. A method according to claim 2 including the step of parking the aircraft of the determined type along other than a predetermined centerline position associated with the defined parking space.

4. A method according to claim 2 wherein the defined parking space is determined in dependence upon a distribution of other aircraft parked in a direction from the aircraft of the determined type.

5. A method according to claim 4 wherein the defined parking space is defined using a best-fit algorithm.

6. A method according to claim 5 wherein the best-fit algorithm is a recursive algorithm for varying simulated defined parking spaces in an iterative fashion to determine the defined parking space, such that a maximum number of aircraft can be parked against the terminal.

7. A method according to claim 2 including the step of providing a human intelligible indication for use in guiding the aircraft of the determined type to a parking position within the defined parking space.

8. A method for parking aircraft at an airport terminal having a plurality of passenger loading bridges, comprising the steps of:
   determining aircraft arrival information for aircraft that are scheduled to arrive at the terminal during a predetermined period of time;
   selecting a subset of aircraft that are to be parked at the terminal during a same overlapping period of time within the predetermined period of time;
   determining available space at the terminal during the same overlapping period of time;
   defining, for each aircraft of the subset of aircraft, a parking position within the available space, each defined parking position other than a predetermined centerline position associated with a passenger loading bridge, each parking position further defined such that at least a minimum spacing is maintained between adjacent aircraft; and,
   relatively moving passenger loading bridges at the terminal so that an aircraft-engaging end of each passenger loading bridge of the plurality of passenger loading bridges is positioned adjacent to a different defined parking position.

9. A method according to claim 8 including the step of stopping each aircraft of the subset of aircraft at a parking position defined for that aircraft, such that a doorway of that aircraft is substantially aligned with the aircraft-engaging end of a passenger loading bridge of the plurality of passenger loading bridges.

10. A method according to claim 8 wherein the aircraft arrival information includes information relating to a size of each aircraft that is scheduled to arrive at the terminal during the predetermined period of time.

11. A method according to claim 10 wherein a best-fit algorithm is used to define a parking position within the available space for each aircraft of the subset of aircraft.

12. A method according to claim 11 wherein the best-fit algorithm is a recursive algorithm for varying simulated aircraft parking positions in an iterative fashion to determine a parking position within the available space for each aircraft of the subset of aircraft such that a maximum number of aircraft can be parked against the terminal during the same overlapping period of time.

13. A method according to claim 8 wherein the same overlapping period of time within the predetermined period of time is a peak demand time.

14. A method according to claim 13 wherein during other than the same overlapping period of time, aircraft scheduled to arrive at the terminal park at a position defined for the peak demand time.

15. A system for parking aircraft at an airport terminal comprising:
   a database having stored therein aircraft arrival information relating to aircraft that are scheduled to arrive at the terminal during a predetermined period of time;
   a processor in communication with the database for defining aircraft parking positions within available parking spaces at the terminal, at least some of the defined aircraft parking positions being other than a predetermined centerline position associated with a passenger loading bridge at an available parking space, the aircraft parking positions further defined such that at least a minimum spacing is maintained between adjacent aircraft; and,
   a controller in communication with the processor, for receiving a signal indicative of the defined aircraft parking positions and for controlling an interaction between aircraft and passenger loading bridges and terminal operations such that the defined aircraft parking positions are implemented as actual parking positions for the aircraft.

16. A system according to claim 15 including an indicating device in communication with the controller, the indicating device for providing an indication for use in guiding an aircraft to one of the defined aircraft parking positions.

17. A system according to claim 16 wherein the indicating device is a visual guidance docking system adapted to provide a human intelligible indication for use by a pilot for guiding an aircraft to a defined parking position, the defined parking position other than a predetermined centerline position associated with a passenger loading bridge.

18. A system according to claim 17 wherein the indicating device includes a wand indicator carried by a support arm for positioning the wand to indicate a defined parking position, the defined parking position other than a predetermined centerline position associated with a passenger loading bridge.

19. A computer readable storage medium having stored therein program code for in execution performing the steps of:

determining a type of an aircraft to be parked at an airport terminal;

defining at the airport terminal a parking space having sufficient room for the aircraft of the determined type to park therein, such that at least a desired clearance is maintained between the aircraft of the determined type and all other aircraft parked at the airport terminal; and, moving a passenger loading bridge associated with the defined parking space so as to accommodate the determined type of an aircraft at the defined parking space while maintaining at least the desired clearance to all other aircraft parked at the airport terminal, and such that for different instances of the determined type of an aircraft being parked at the airport terminal, the associated passenger loading bridge is moved to substantially different locations to accommodate different defined parking spaces.

* * * * *